United States Patent [19]

Baylor et al.

[11] Patent Number: 5,015,301
[45] Date of Patent: May 14, 1991

[54] VEHICLE POWER STEERING FLUSH APPARATUS AND METHOD

[75] Inventors: James L. Baylor, Fontana; Tsu-Pow G. Tsao, Lakewood; Michael J. Camacho, Covina, all of Calif.

[73] Assignee: Wynn Oil Company, Fullerton, Calif.

[21] Appl. No.: 487,196

[22] Filed: Mar. 1, 1990

[51] Int. Cl.⁵ .................... B08B 3/00; B08B 9/00
[52] U.S. Cl. .................... 134/22.1; 134/22.12; 134/22.14; 134/22.18; 134/169 A
[58] Field of Search ............. 134/22.1, 22.12, 22.14, 134/22.18, 169 R, 169 A, 18; 137/240; 422/106, 110

[56] References Cited

U.S. PATENT DOCUMENTS

| 3,180,759 | 4/1965 | Falk | 134/22.12 |
| 4,597,416 | 7/1986 | Scales | 134/169 A |
| 4,606,363 | 8/1986 | Scales | 134/169 A |
| 4,791,890 | 12/1988 | Miles et al. | 134/169 A |
| 4,877,043 | 10/1989 | Carmichael et al. | 134/169 A |

Primary Examiner—Theodore Morris
Assistant Examiner—Saeed Tahir Chaudhry
Attorney, Agent, or Firm—William W. Haefliger

[57] ABSTRACT

The method of flushing a vehicle power steering apparatus enclosure that contains first pressure fluid includes providing a container having a first zone for reception of a predetermined quantity of flushing liquid, and having a second fluid pressure zone, the container having an inlet for filling flushing liquid into the first zone; providing a pusher in the container to extend between such zones; connecting flushing liquid delivery apparatus with the container to receive pressurized flushing liquid displaced under pressure from the first zone in response to movement of the pusher; connecting a vehicle power steering apparatus enclosure with the delivery apparatus to receive pressurized flushing liquid to flush the steering apparatus; and connecting a source of fluid pressure with the second zone for pressurally displacing the pusher toward the first zone to pressurize the flushing liquid, expelling a predetermined quantity thereof to the delivery apparatus and to the power steering apparatus, for flushing same.

16 Claims, 4 Drawing Sheets

VEHICLE POWER STEERING FLUSH APPARATUS AND METHOD

BACKGROUND OF THE INVENTION

This invention relates generally to flushing and/or cleaning of vehicle power steering apparatus enclosures and mechanisms, and more particularly to an easily used system wherein the amount and application of liquid flushing solutions used can be easily and accurately controlled.

There is need for an easy to use system which is useful to flush vehicle power steering devices, and which does not encounter the disadvantages of the above described prior purge system; and there is need for a unit or portable apparatus that will handle the complete flushing apparatus, including dealing with waste liquid flushed from the power steering unit, to meet environmental standards.

SUMMARY OF THE INVENTION

It is a major object of the invention to provide an improved overall system that meets the above needs, and overcomes prior problems and disadvantages. Basically, the apparatus of the invention is operable to flush a vehicle power steering apparatus unit that contains a first pressure fluid (the fluid used for power steering purposes and which can become dirty or contaminated); and the combination of the present invention includes:

(a) a container having a first zone for reception of a predetermined quantity of flushing liquid, and having a second fluid (for example compressed gas) pressure zone, the container having an inlet for filling the flushing liquid into the first zone, (b) a pusher carried by the container to extend between the zones, (c) flushing liquid delivery means operatively connected with the container to receive pressurized flushing liquid displaced under pressure from the first zone in response to movement of the pusher in the container, (d) a vehicle power steering apparatus enclosure connected with the delivery means to receive pressurized flushing liquid for flushing the apparatus, (e) and the container having a second inlet connectible with a source of fluid pressure (for example compressed gas) to be controllably delivered to the second zone for pressurally displacing the pusher toward the first zone, thereby to pressurize the flushing liquid and expel a predetermined quantity thereof to the delivery means.

As will appear, the pusher advantageously comprises a traveling bladder in the container; and the container typically has an upright position wherein the first zone contains the flushing liquid directly above the traveling bladder, and the second zone for pressurized gas is directly below the bladder, whereby when flushing liquid is filled into the first zone via the inlet, the bladder is displaced downwardly toward and into the second zone by the weight of the infilled flushing liquid. The amount of infilled flushing liquid may be the predetermined amount to be delivered to the steering apparatus, since the bladder in full up-position has expelled that amount of liquid from the container.

It is another object of the invention to provide said source of fluid pressure in the form of pressurized air and including a line for delivering air pressure to the second zone, and a pressure regulator connected in series with the line. The pressure regulator includes adjustable means for controlling the level of regulated air pressure delivered to the second zone. Also, a control valve is connected in series with the line for controlling regulated air pressure delivery to the second zone.

It is another object of the invention to provide means for purging ga bubbles for the flushing liquid delivery means.

Yet another object is to provide a waste liquid reservoir for flush liquid that has passed through the steering system, and a line connected between the steering apparatus enclosure and the receiver for delivering waste steering fluid, and flush liquid to the receiver. A carrier in the form of a cart may be provided for both the bladder container, and the waste liquid receiver, with controls for the regulator and valve, and suitable pressure gauges, as will be seen.

These and other objects and advantages of the invention, as well as the details of an illustrative embodiment, will be more fully understood from the following specification and drawings, in which:

DRAWING DESCRIPTION

DETAILED DESCRIPTION

Figure 1:
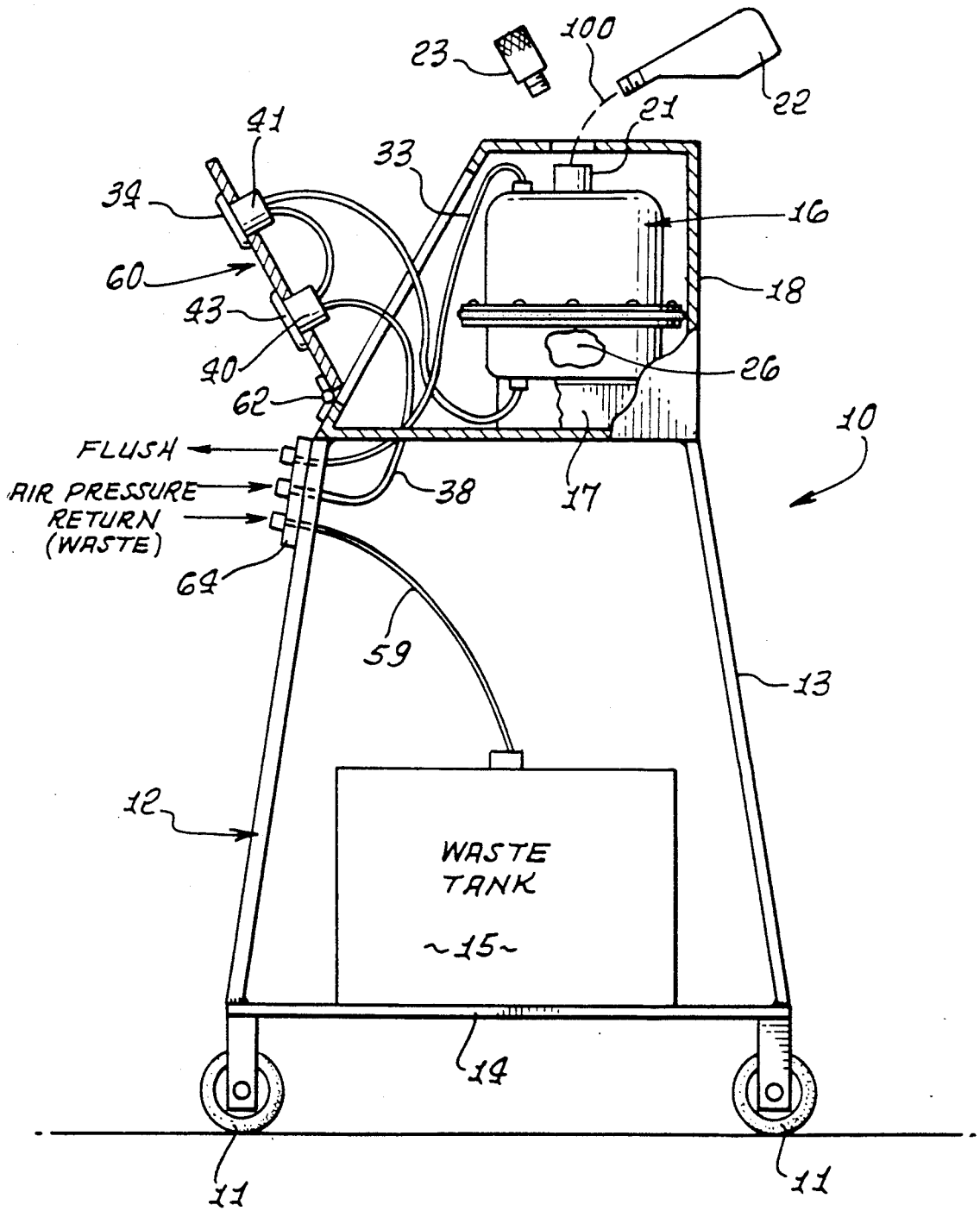
FIG. 1 is a side elevation showing a flush treatment kit or stand that is movable and usable for controllably flushing the steering unit of a vehicle.

Referring first to FIG. 1, a cart 10 has wheels 11 by which it is movable about, as in a filling station garage. It includes a frame 12, with uprights and a support 14 for waste tank 15. A container or vessel 16 is supported at 17 above the waste tank, and within an enclosure or housing 18.

Figure 2:
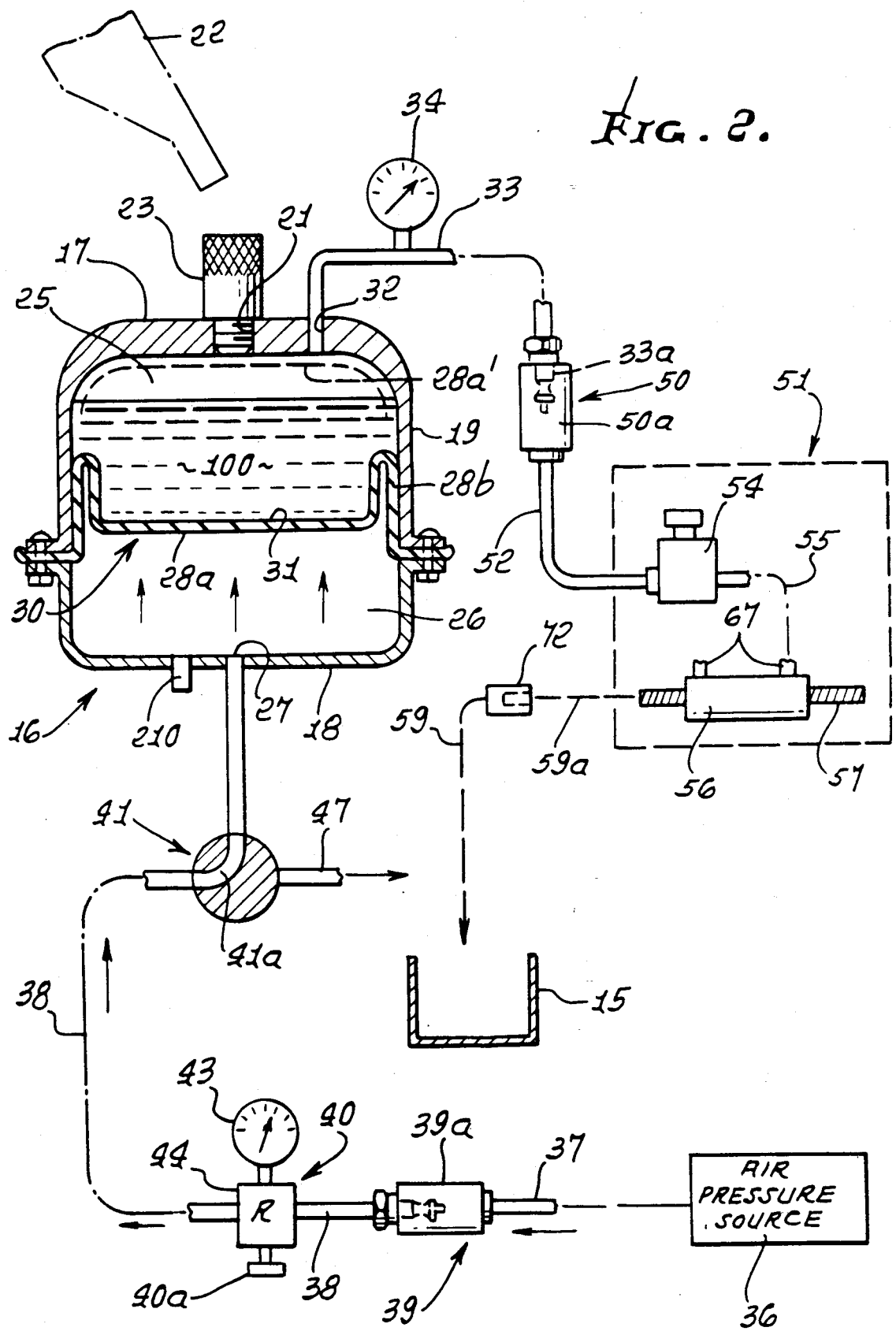
FIG. 2 is a system flow diagram.

Extending the description to FIG. 2, the container 16 has top, bottom and side walls 17-19. The top wall 17 contains an inlet 21 for passing flush liquid poured from a supply bottle 22, as indicated in FIG. 1. For that purpose, a cap or plug 23 is removable from the inlet 21. After the predetermined amount of flush liquid 100 has been then introduced into a first (upper) zone 25 in the container, the cap or plug is replaced, as indicated in FIG. 2. The container also has a second (lower) zone 26 below zone 25 for reception of air pressure, via an inlet 27 in bottom wall 18. Zone 26 also has a built-in pressure relief at 210 as a safety device to eliminate or vent overpressure A pusher, as for example an elastomeric bladder 30, is carried by and within the container 16 to extend transversely between, and to separate, the two zones 25 and 26. The bladder is preferably a traveling bladder, forming a downwardly re-entrant recess 31 that receives the flushing liquid, that recess traveling upwardly and reducing in size, as the bladder bottom wall 28a is pushed upwardly by air pressure in zone 26. Note bladder side wall formed at 28b. In extreme up-position, the bladder covers the inner side of top wall 17 of the container (see broken lines 28a'), all the flush liquid then being expelled via outlet 32 to delivery duct 33. The inlet 21 is then closed or blanked by the bladder wall 28a. Pressure exerted upon the flush liquid is indicated by a gauge 34 connected to duct 33, as shown.

Pressure applied to lower zone 26 typically originates at a pressure source 36, as for example an air pressure tank, from which a hose extends at 37. A line 38 associated with zone 26 has quick connection (stab) at 39 with the end of the hose 37, which opens a standard shut-off valve in that part 39a of the connection carried at the end of the hose. Air pressure then passes through line 38, via a pressure regulator 40, to a valve 41. When the valve is open, as indicated, regulated air pressure passes to the inlet 27 and to lower zone 26 in the vessel or container 16. Regulator 40 has an adjustment 40a by means of which the regulated pressure passed to inlet 27 may be controlled. Note also regulated air pressure gauge 43 on the regulator housing 44. As referred to above, pressure relief valve 210 is provided, and may be set at around 30 psi for example.

When valve 41 is closed, line 38 is closed, and inlet 27 is connected to atmosphere, as via shipped valve passage 41a and outlet port 47. At that time, the air pressure in zone 26 is exhausted, and the bladder can drop or fall, as for example to the position seen in FIG. 2, i.e., forming the re-entrant recess to receive infilled flush liquid. Accordingly the apparatus provides a simple and effective metering and self-positioning means.

Also, as seen in FIG. 2, the flush liquid delivery means duct 33 passe the pressurized flush liquid via a quick connection 50 to the power steering unit 51. When connection 50 is made up (pushed together), a double shut-off valve or valves in receptacle part 50a and in 33a is or are opened, and flushing liquid passes at line 52 to the reservoir 54 of the steering unit 51. (Likewise, shut-off valves in the connecting parts of connection 72 are opened when that connection is made up.) The outlet of that reservoir connects via line 55 to an enclosure 56 for steering rack 57, there being conventional valving (not shown) in 56 to allow the rack to be traveled to the left or right under power assist, as the vehicle steering wheel is turned. Waste flush liquid passed from the enclosure 56 is delivered via line 59 to the waste tank 15 referred to. Any air bubbles initially in line 33 may be expelled by first connecting hose 33 to hose 59, and viewing discharge of bubbles, and only then disconnecting 33 from 59 and making up the quick disconnect 50. Note that line 59 may be transparent for viewing discharge of bubbles, the pressure at the regulator then being set at a low level so as not to force rapid expelling of flush liquid before the quick disconnect 50 is made up. The regulator is thereafter set at a high level for driving flush liquid through the steering unit, as the steering wheel is rotated back and forth for complete flushing.

FIG. 1 also shows a control panel 60 that mounts the regulator 40, valve 41, and gauges 34 and 43. That panel 60 may be hinged at 62, as shown, to allow access to the container 16 in housing 18. Lines 33 and 38 pass through a lower panel 64 forming part of the housing 18.

Figure 3:
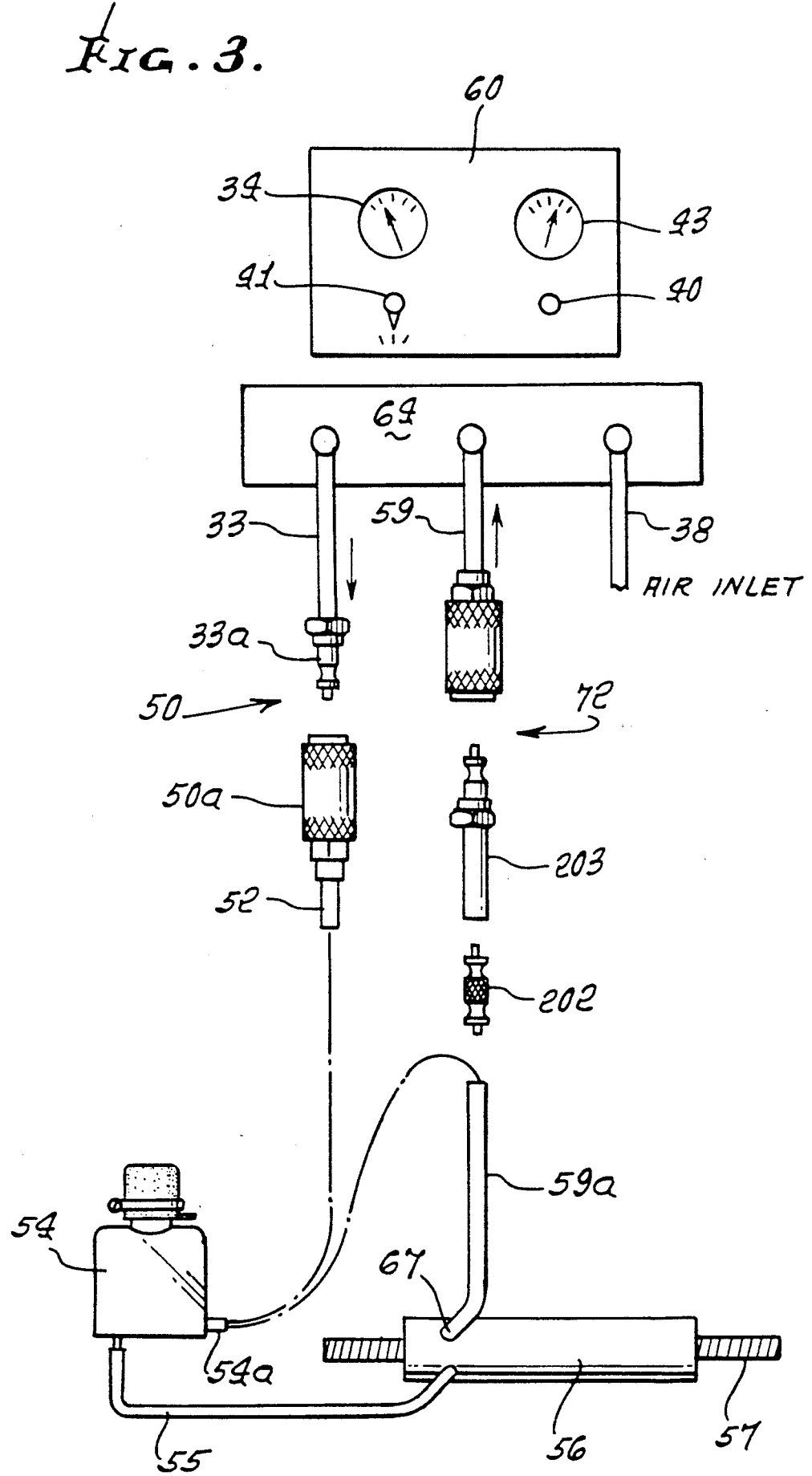
FIG. 3 is a diagram showing connections and adapters usable to connect the apparatus of FIG. 1 to one type steering unit.

The arrangement of connection elements seen in FIG. 3 is substantially the same as described in FIG. 2 so that corresponding elements bear the same numbers. Note that line 52 may normally be connected to inlet 203 of reservoir 54 from where hose 59a has been removed.

In FIG. 3, the vehicles's low side hose 59a remains connected to port 67, and the open-end of 59a is attached via double male end barbed connector 202 to return adapter 203, and connects to the waste liquid line 59 (leading to tank 15) via another quick disconnect 72, as referred to above.

Figure 4:
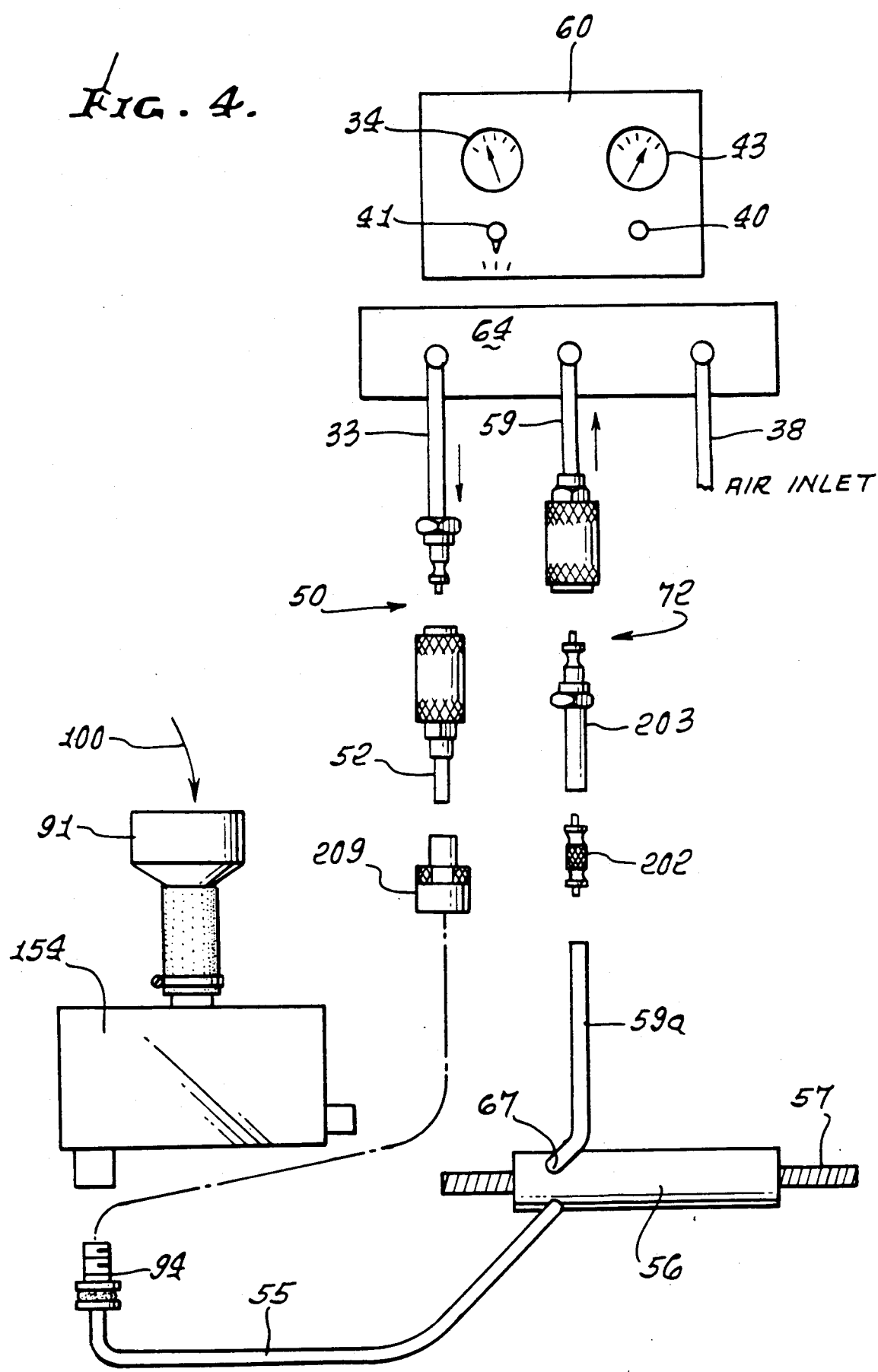
FIG. 4 is a diagram showing connections and adapters usable to connect the FIG. 1 apparatus to a second type steering unit.

In FIG. 4, flush liquid 100 is added directly to the reservoir 154, modified by use of adapter funnel 91. At the end of this liquid flush 100 cleaning cycle, low side hose 59a and high side hose 55 are removed from connection to reservoir 154 low side hose 59a. The open end of 59a is then attached to return adapter 203 via double male end hose connector 202. High side hose 55 is then attached to supply adapter 52 via a high pressure adapter 209 at 94 of hose 55.

Referring to the method of use of the FIG. 3 elements, see the following sequence:

1. Disconnect low side hose 59a from 54.
2. Connect adapter hose 52 to reservoir 54 at 54a.
3. Connect hose 59a via return adapter 203 and double male end hose connector 202 to hose 59.
4. Three-way valve 41 is OFF.
5. Remove tank plug 23 from top of tank 16, as seen in FIGS. 1 and 2. Add power steering liquid cleaner to tank.
6. Reinstall tank plug 23 by hand. See FIGS. 1 and 2.
7. Bleed the air from the tank as by applying low air pressure via line 38 to zone 26 in 16. See FIGS. 1 and 2, wherein low pressure applied to zone 26 will drive bladder 30 upwardly, the bladder in turn pushing (bleeding) air from the space above the bladder and out the inlet 21.
8. Three-way valve 41 is now turned to ON.
9. Make-up hose 59 to hose 33 by initially quick connect portion of 50 into quick-connect coupler portion of 72.
10. When air bleeding is complete, disconnect quick connect male portion of 50 from quick connect coupler portion of 72, and make-up connection 50 as well as connection 72.
11. Connect 52 to 54a; and connect 59a to 203 via 202.
12. Adjust regulator to apply high pressure to 26, and allow bladder 31 to move upwardly, (See FIGS. 1 and 2) displacing cleaning fluid through the reservoir 54 and the steering unit 56.
13. After flushing is completed (observed by looking at transparent line 59 and noting end of passage of dirty liquid and beginning of passage of clean liquid), close valve 41, disconnect 52 from 54a, and disconnect 59a from 203, and reconnect 59a to 54a.

SUMMARY

To summarize the overall process, the following steps are carried out, employing the mobile cart 10 carrying the FIGS. 1–3 (or FIGS. 1, 2, and 4) elements referred to and also the supply containers for liquid to be displaced into the power steering system:

1. Displace cleaner liquid into the steering system, after connecting the apparatus as referred to, to the steering system.
2. Disconnect the apparatus and reconnect the steering system, and start the engine to activate the power steering pump which circulates the supplied liquid and cleans the system. Turn engine off.
3. During step 2, supply additional liquid to the tank 16. Such fluid typically consists of power steering fluid with a liquid sealant and a conditioner therein, for example, Wynn Oil Company product 61901 and 77512.
4. Reconnect the apparatus to the power steering system to repeat step (1) until the added clear liquid replaces the dirty or darker liquid from the steering system.

5. Disconnect the apparatus, and reconnect the steering system components.

We claim:

1. In a system for flushing a vehicle power steering apparatus that contains first pressure fluid, the combination comprising:
    (a) a container having a first zone for reception of a quantity of flushing liquid, and having a second fluid pressure zone, the container having an inlet for filling said flushing liquid into said first zone,
    (b) a pusher carried by the container to extend between said zones,
    (c) flushing liquid delivery means operatively connected with the container to receive pressurized flushing liquid displaced under pressure from said first zone in response to movement of the pusher in the container,
    (d) a vehicle power steering apparatus enclosure connected with said delivery means to receive pressurized flushing liquid for flushing said apparatus,
    (e) and the container having a second inlet connectible with a source of fluid pressure to be controllably delivered to said second zone for pressurally displacing said pusher toward the first zone, thereby to pressurize said flushing liquid and expel a quantity thereof to said delivery means.

2. The combination of claim 1 wherein said pusher comprises a traveling bladder in said container.

3. The combination of claim 2 wherein the container has upright position wherein the first zone contains said flushing liquid directly above the traveling bladder, and the second zone for pressure liquid is directly below the bladder, whereby when flushing liquid is filled into said first zone via said inlet, the bladder is displaced downwardly toward and into said second zone by the weight of the in-filled flushing liquid.

4. The combination of claim 1 wherein the container has a delivery port for passing said flushing liquid from said first zone in response to movement of the pusher toward the first zone, the positions of the delivery port and the pusher being so related that the volume of the first zone is reduced substantially to zero when substantially all of the flushing liquid has been displaced to said liquid delivery means.

5. The combination of claim 3 wherein the container has a delivery port for passing said flushing liquid from said first zone in response to movement of the traveling bladder toward said delivery port, the positions of the delivery port and the bladder being so related as respects travel of the bladder toward said port that the volume of the first zone is reduced substantially to zero when substantially all of the flushing liquid has been displaced to said liquid delivery means by the bladder via said delivery port.

6. The combination of claim 1 wherein said source of fluid pressure includes a line for delivering air pressure to said second zone, and a pressure regulator connected in series with said line.

7. The combination of claim 6 wherein said regulator includes adjustable mean for controlling the level of regulated air pressure delivered to said second zone.

8. The combination of claim 7 including a control valve connected in series with said line for controlling regulated air pressure delivery to said second zone.

9. The combination of claim 1 including means for purging gas bubbles from said flushing liquid delivery means.

10. The combination of claim 1 including a flushed liquid receiver, and a line connected between said steering apparatus enclosure and said receiver for delivering waste steering fluid, and flush liquid to the receiver.

11. The combination of claim 10 including an ambulatory carrier for said container and said flush liquid receiver.

12. In the method of flushing a vehicle power steering apparatus enclosure that contains first pressure fluid, the steps that include:
    (a) providing a container having a first zone for reception of a quantity of flushing liquid, and having a second fluid pressure zone, the container having an inlet for filling said flushing liquid into said first zone,
    (b) providing a pusher in the container to extend between said zones,
    (c) connecting flushing liquid delivery means with the container to receive pressurized flushing liquid displaced under pressure from said first zone in response to movement of the pusher,
    (d) connecting a vehicle power steering apparatus enclosure with said delivery means to receive pressurized flushing liquid to flush said apparatus,
    (e) and connecting a source of fluid pressure with said second zone for pressurally displacing said pusher toward said first zone to pressurize said flushing liquid, expelling a quantity thereof to the delivery means and to the power steering apparatus, for flushing same.

13. The method of claim 12 including flowing waste flushing liquid from the power steering apparatus to a waste tank.

14. The method of claim 13 including providing a mobile transporter, and mounting the container and waste fluid on the transporter.

15. The method of claim 12 wherein the pusher comprises a traveling bladder in the container, and the steps of the method include orienting the container and filling flush liquid into the container to exert weight on the bladder, tending to drive it downwardly in the container so that a charge of the flush liquid may be stored directly above the bladder in position to be expelled to the steering apparatus when the bladder is displaced upwardly.

16. In a system for flushing a vehicle power steering apparatus that contains first pressure fluid, the combination comprising:
    (a) a container having a first zone for reception of a quantity of flushing liquid, and having a second fluid pressure zone, the container having an inlet for filling said flushing liquid into said first zone,
    (b) a pusher carried by the container to extend between said zones,
    (c) flushing liquid delivery means operatively connected with the container to receive pressurized flushing liquid displaced under pressure from said first zone in response to movement of the pusher in the container, said delivery means adapted for connection to said vehicle power steering apparatus, to receive pressurized flushing liquid for flushing said apparatus,
    (d) the container having a second inlet connectible with a source of fluid pressure to be controllably delivered to said second zone for pressurally displacing said pusher toward the first zone, thereby to pressurize said flushing liquid and expel a quantity thereof to said delivery means, (e) the container having upright position wherein the first zone contains said flushing liquid directly above said pusher which comprises a traveling bladder, and the second zone for pressure liquid is directly below the bladder, whereby when flushing liquid is filled into said first zone via said inlet, the bladder is displaced downwardly toward and into said second zone by the weight of the in-filled flushing liquid.

* * * * *